US012459095B2

(12) United States Patent
Ji

(10) Patent No.: US 12,459,095 B2
(45) Date of Patent: Nov. 4, 2025

(54) FASTENER DRIVER

(71) Applicant: Zhejiang Chengxing Technology Co., Ltd., Zhejiang (CN)

(72) Inventor: Shian Ji, Zhejiang (CN)

(73) Assignee: Zhejiang Chengxing Technology Co., Ltd., Zhejiang (CN)

( * ) Notice: Subject to any disclaimer, the term of this patent is extended or adjusted under 35 U.S.C. 154(b) by 0 days.

(21) Appl. No.: 18/805,514

(22) Filed: Aug. 14, 2024

(65) Prior Publication Data

US 2025/0100119 A1 Mar. 27, 2025

(30) Foreign Application Priority Data

Sep. 27, 2023 (CN) ......................... 202322648270.0
Apr. 23, 2024 (CN) ......................... 202420848610.6

(51) Int. Cl.
*B25C 1/06* (2006.01)

(52) U.S. Cl.
CPC ...................................... *B25C 1/06* (2013.01)

(58) Field of Classification Search
CPC ........................................................ B25C 1/06
See application file for complete search history.

(56) References Cited

U.S. PATENT DOCUMENTS 5,118,023 A * 6/1992 Fushiya .................... B25C 1/06 227/8
5,503,319 A * 4/1996 Lai ............................ B25C 5/15 227/132
6,899,260 B2 * 5/2005 Sun ........................... B25C 1/06 74/49
7,104,432 B2 * 9/2006 Sun ........................... B25C 1/06 227/129
7,152,774 B2 * 12/2006 Chen ......................... B25C 1/06 227/129
7,445,139 B2 * 11/2008 Okouchi ................... B25C 1/06 227/8
10,442,066 B2 * 10/2019 Nishikawa ................ B25C 7/00
2012/0211540 A1 * 8/2012 Kondou .................... B25C 1/00 227/140
2021/0078149 A1 * 3/2021 Pedicini .................. B25C 1/047

(Continued)

FOREIGN PATENT DOCUMENTS

CN 116175490 A * 5/2023 ............... B25C 1/06
CN 220699506 U * 4/2024

*Primary Examiner* — Lucas E. A. Palmer
(74) *Attorney, Agent, or Firm* — JCIPRNET

(57) ABSTRACT

A fastener driver including a housing, a driving mechanism located in the housing, an emission mechanism, a first guide member and second guide members is provided. The emission mechanism includes a piston, a driver firing pin attached to the piston, a bias mechanism and a jack assembly. The bias mechanism is provided with a first end portion supported in the piston and a second end portion supported by a head portion. The jack assembly is operated by the driving mechanism to enable the piston and the driver firing pin to move from the second position to the first position against a bias force of the bias mechanism. The first guide member movably supports the piston. The second guide members movably support a support frame. The second guide members are positioned between the first guide member and the jack, and disposed in parallel to the first guide member.

10 Claims, 10 Drawing Sheets

(56) References Cited

U.S. PATENT DOCUMENTS

| | | | | |
|---|---|---|---|---|
| 2021/0347025 | A1* | 11/2021 | Wyler | B25C 1/047 |
| 2022/0226977 | A1* | 7/2022 | Nettleton | B25C 1/005 |
| 2022/0226978 | A1* | 7/2022 | Nettleton | B25C 5/162 |

* cited by examiner

FASTENER DRIVER

CROSS-REFERENCE TO RELATED APPLICATION

This application claims the priority benefit of Chinese application serial no. 202322648270.0, filed on Sep. 27, 2023 and Chinese application serial no. 202420848610.6, filed on Apr. 23, 2024. The entirety of the above-mentioned patent applications are hereby incorporated by reference herein and made a part of this specification.

BACKGROUND

Technical Field

The present invention relates to a fastener driver, and in particular to a nailer.

Description of Related Art

According to a nailer, a firing pin is pushed by instantaneously released energy to do hammering motion, and a fastener in a nail box is emitted out from a nailer nozzle at a high speed to complete the fixation of an object. The nailer generally includes an energy storage mechanism, a nailing component and a jacking mechanism, the nailing component is driven to do a reciprocating motion through the jacking mechanism and the energy storage mechanism, and a medium in an energy storage cylinder is compressed to obtain instantaneously released nailing energy. The nailer is widely applied to decoration industry. According to different energy source systems, the nailers may be divided into an electric nailer, a pneumatic nailer, a manual nailer, etc. At present, the electric nailer adopts various driving manners.

The jacking mechanisms are in various forms, such as rack-and-pinion-like jacking, gear cam jacking, lead screw nut jacking, etc. at present. However, these designs have the problems of low transmission efficiency, unreliable transmission, unreasonable product size, etc. By aiming at the above problems, it is necessary to improve the nailer.

SUMMARY

In one aspect, the present invention provides a fastener driver, including: a housing limiting a head portion and a handle portion, a driving mechanism located in the housing, and an emission mechanism. The emission mechanism including a piston, a driver firing pin, a bias mechanism and a jack assembly. The driver firing pin is attached to the piston. The bias mechanism is provided with a first end portion supported in the piston and a second end portion supported by the head portion, and is configured to enable the piston and the driver firing pin to move from a first position to a second position. The jack assembly is operated by the driving mechanism to enable the piston and the driver firing pin to move from the second position to the first position against a bias force of the bias mechanism. A first guide member and second guide members are also included. The first guide member movably supports the piston. The second guide members movably support a support frame, the support frame is connected with the piston and moves together with the piston. The second guide members are positioned between the first guide member and the jack, and disposed in parallel to the first guide member. Cylindrical protruding shafts are disposed on the support frame in a protruding manner towards the jack assembly, convex arc-shaped protruding portions are disposed on the jack assembly in a protruding manner towards the support frame, and the protruding portions and the protruding shafts cooperate with each other to transmit torsion output by the driving mechanism to the emission mechanism. Due to convex arc shapes of the protruding portions, acting forces received by the protruding portions and the protruding shafts in a relative motion process of the protruding portions and the protruding shafts is always in an arc and cylindrical surface contact state. By using such a transmission manner, a dramatic change of an output moment may be avoided, the torsion output by the driving mechanism is stable, and the shock of a product in use is reduced.

Further, the first guide member of the fastener driver is in a cylindrical shape, and the emission mechanism is sheathed on a first guide mechanism.

Further, the second guide members of the fastener driver are a pair of U-shaped rigid members, the second guide members are fixedly disposed in the housing, and the support frame is located between the second guide members and slides between the second guide members.

Further, avoiding portions are formed in the second guide members of the fastener driver, and the second guide members are able to avoid interference in a rotating process of the jack assembly due to the avoiding portions.

Further, the protruding shafts and the protruding portions of the fastener driver are at least two pairs and are disposed in pairs, and are preferably three pairs, so that the emission mechanism may achieve a greater impact force.

Further, circle center connecting lines of a plurality of protruding shafts of the fastener driver are parallel to the first guide member.

Further, heights of the protruding shafts of the fastener driver protruding from the support frame sequentially rise from the second position to the first position, and protruding heights of the protruding portions cooperating with the protruding shafts correspondingly and sequentially decrease.

Further, the support frame of the fastener driver is in an approximately 90° L shape, the protruding shafts are integrally disposed on the support frame, a through hole is further formed in the support frame, and the first guide member passes through the through hole; or the support frame is formed by bending a metal plate, and the protruding shafts are formed into a whole with the support frame through welding, riveting or interference fit.

Further, the jack assembly of the fastener driver includes an output shaft, an output support frame and protruding portions. One end of the output shaft is connected with the driving mechanism, the other end of the output shaft is connected with the output support frame, and the protruding portions are disposed on the protruding support frame and extend in a direction far away from the driving mechanism.

Further, the protruding portions and the output support frame of the fastener driver are integrally formed, or the protruding portions and the output support frame are formed into a whole through welding, riveting or interference fit.

Further, a rotatable sheathing ring is sheathed outside each of the protruding shafts of the fastener driver, the protruding portions and the corresponding sheathing rings act with each other, and an output moment of the driving mechanism is transmitted to the emission mechanism.

The present invention has the following beneficial effects:

1. The second guide members are parallelly disposed in positions with a certain distance from the first guide mechanism, and additionally, the second guide members are fixed onto the housing, so that the nailer can stably move in a transmission process, and the shock of a machine is reduced.

2. Surfaces of the protruding portions in the jack assembly in contact with the protruding shafts are designed to present convex arc shapes, so that the sudden change of acting forces in a process that the protruding portions and the protruding shafts cooperate with each other to transmit the torsion cannot occur, the transmission smoothness of the torque is ensured, a moment transmission efficiency may be improved, and the friction between the protruding shafts and the protruding portions may be reduced.
3. Further, a rotatable ring is sheathed outside each of the protruding shafts, and the sliding friction and rotating friction between the protruding portions and the protruding shafts are totally converted into rotating friction. Under the condition of transmitting the same moment, the rotating friction is certainly much smaller than sliding friction. Through such a design, the moment transmission efficiency may be greatly improved.
4. The support frame is disposed between the second guide members, so that the service life of the product may be prolonged.
5. In order to obtain stronger nailing force, the support frame needs to be pushed farther. That is, under the condition that springs are compressed by the bias force, the springs are compressed to be shorter if the distance between the first position and the second position is longer, and stronger nailing force may be obtained. In the rotating process of the jack assembly, if the distance between the output shaft and the protruding portions is longer, the support frame may be pushed to the farther first position, but a greater rotating space is needed if the distance between the output shaft and the protruding portions is longer, and a thickness of the housing correspondingly needs to be increased. Interference portions between the second guide members and the protruding portions adopt an avoiding design, the support frame may be pushed as far as possible without increasing the thickness of the housing. In order to ensure the strength of the second guide members, the interference position of the second guide members and the protruding portions are set to be the position of just starting to push the support frame, at this moment, the bias force to be overcome is small, and the correspondingly output torque is smaller. From the structure, that is, the first protruding portion is designed to have the greatest protruding length, and the first protruding shaft cooperating with the first protruding portion is designed to have the smallest protruding length.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

In the figures,

10 denotes a fastener driver, 14 denotes a box, 12 denotes a fastener, 18 denotes a front end component, 20 denotes a mortise and tenon structure, 22 denotes a housing, 24 denotes a parting line, 26 denotes a head portion, 30 denotes a handle portion, 34 denotes a battery receiving seat portion, 38 denotes a battery pack, 42 denotes a trigger, 46 denotes a driving mechanism, 50 denotes an electric motor, 54 denotes a gearbox, 56 denotes an output shaft, 58 denotes a jack assembly, 62 denotes an emission mechanism, 66 denotes a piston, 68 denotes a bias member, 70 and 72 denote a compressed spring, 74 denotes a driver firing pin, 73 denotes a first position, 75 denotes a second position, 80 denotes a first guide member, 82 denotes a second guide member, 86 denotes a support frame, 90 denotes an axial line, 96 denotes a round rotating ring, 98 denotes a first protruding shaft, 102 denotes a second protruding shaft, 103 denotes a third protruding shaft, 104 denotes a first protruding portion, 108 denotes a second protruding portion, 109 denotes a third protruding portion, 112 denotes a framework, 114 denotes an end cover, 115 denotes a seat portion, 116 denotes a through hole, 130 denotes a long straight line surface, 131 denotes a short straight line surface, 132 denotes a long concave arc surface, and 133 denotes a short concave arc surface.

DESCRIPTION OF THE EMBODIMENTS

Figure 1:
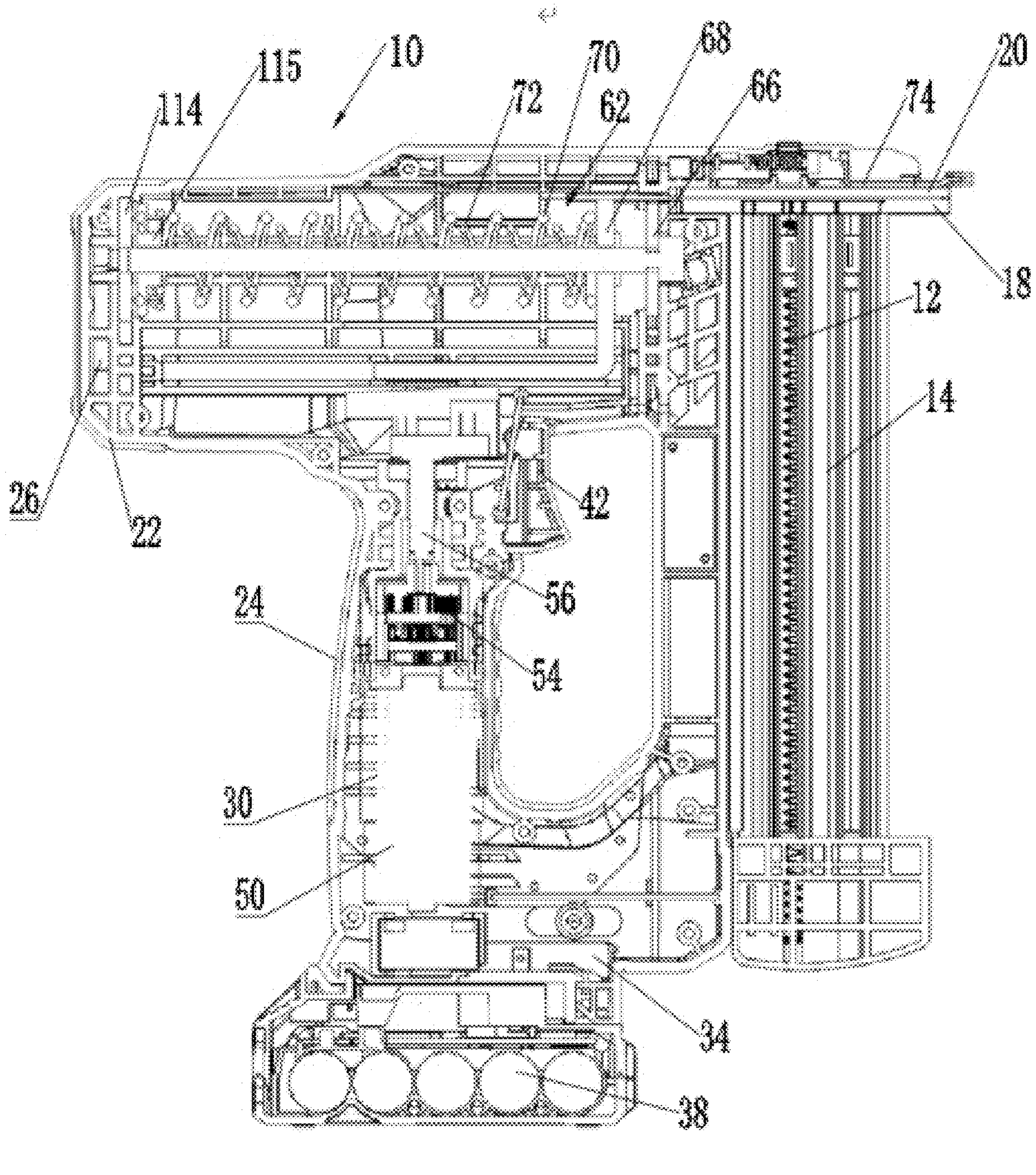
FIG. 1 is a stereoscopic schematic diagram of a fastener driver.

FIG. 1 shows a fastener driver 10 (for example, a nailer) used for driving a fastener 12 (for example, a nail) fixedly held in a box 14 into a workpiece. The driver 10 includes a front end component 18, and the front end component sequentially receives the fastener from the box 14 before each fastener driving operation. The front end component 18 includes a contact mortise and tenon structure 20, and the mortise and tenon structure allows the driver 10 to operate in a single-shooting mode. In some embodiments of the driver 10, the contact mortise and tenon structure 20 may be allowed to be operated in a single-shooting mode and/or sudden-shooting or continuous-shooting mode. The driver 10 includes a housing 22, the housing limits a head portion 26 and a handle portion 30 and receives a battery receiving portion 34 of battery packs 38. In shown embodiments, the housing 22 is longitudinally divided into a first housing portion and a second housing portion in a position of a parting line 24.

Figure 2:
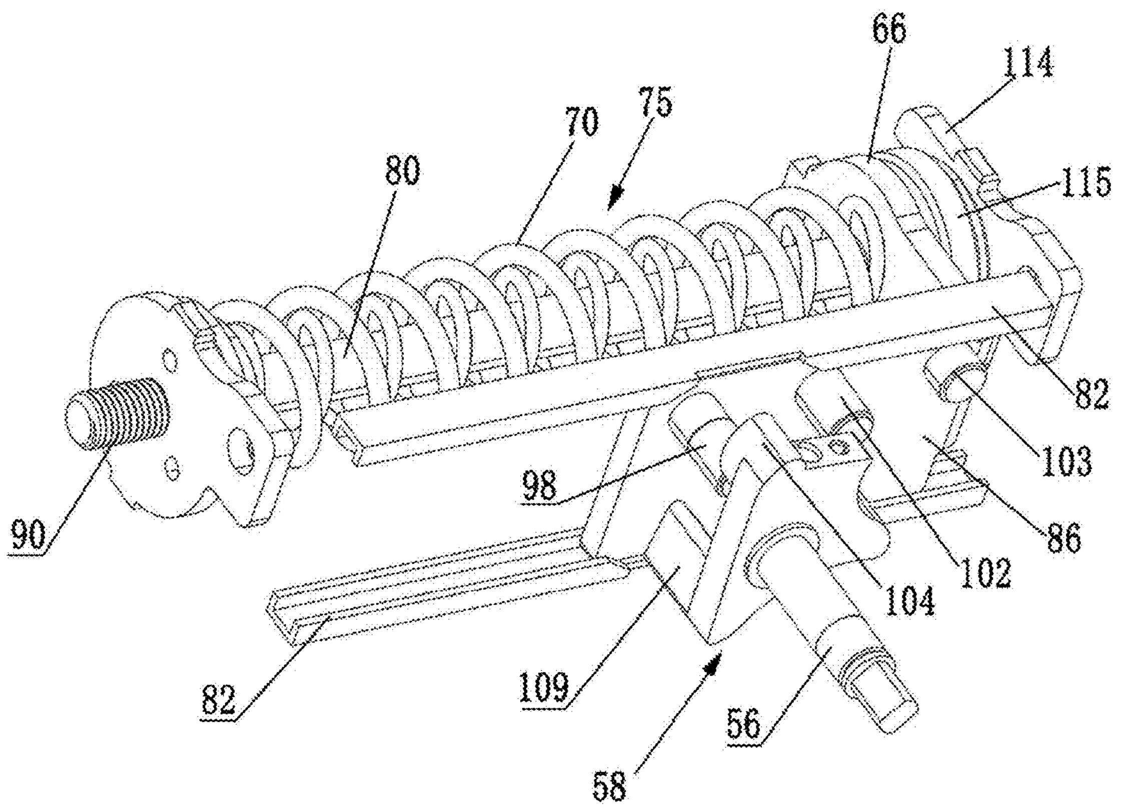
FIG. 2 is a schematic diagram of a stereoscopic structure of an emission mechanism and a jack assembly of the fastener driver in FIG. 1, and the emission mechanism is in a second position.

Referring to FIG. 2, the fastener driver 10 includes a trigger 42. The trigger selectively provides power for a driving mechanism 46 sealed in the handle portion 30 of the driver 10. The driving mechanism 46 includes an electric motor 50, a gearbox 54 and an output shaft 56, the gearbox receives a torque from the motor 50, and an output shaft is driven by the gearbox 54.

The fastener driver 10 includes an emission mechanism 62 in the head portion 26 of the housing 22. The emission mechanism 62 is connected to the driving mechanism 46, and operably executes the fastener driving operation. The emission mechanism 62 includes a movable member (for example, a piston 66) configured to do a reciprocating motion in the head portion 26, a bias member 68 (for example, one or a plurality of compressed springs 70 and 72) abutting the piston 66 to be located in a second position, and a driver firing pin 74 attached to the piston 66. The bias member 68 pushes the piston 66 and the driver firing pin 74 in the head portion 26 to the second position 75 at the bottom so as to drive the fastener into the workpiece. In shown embodiments, the bias member 68 includes a pair of nested compressed springs 70 and 72. These compressed springs cooperatively act to push the piston 66 and the driver firing pin 74 to the second position 75.

Figure 3:
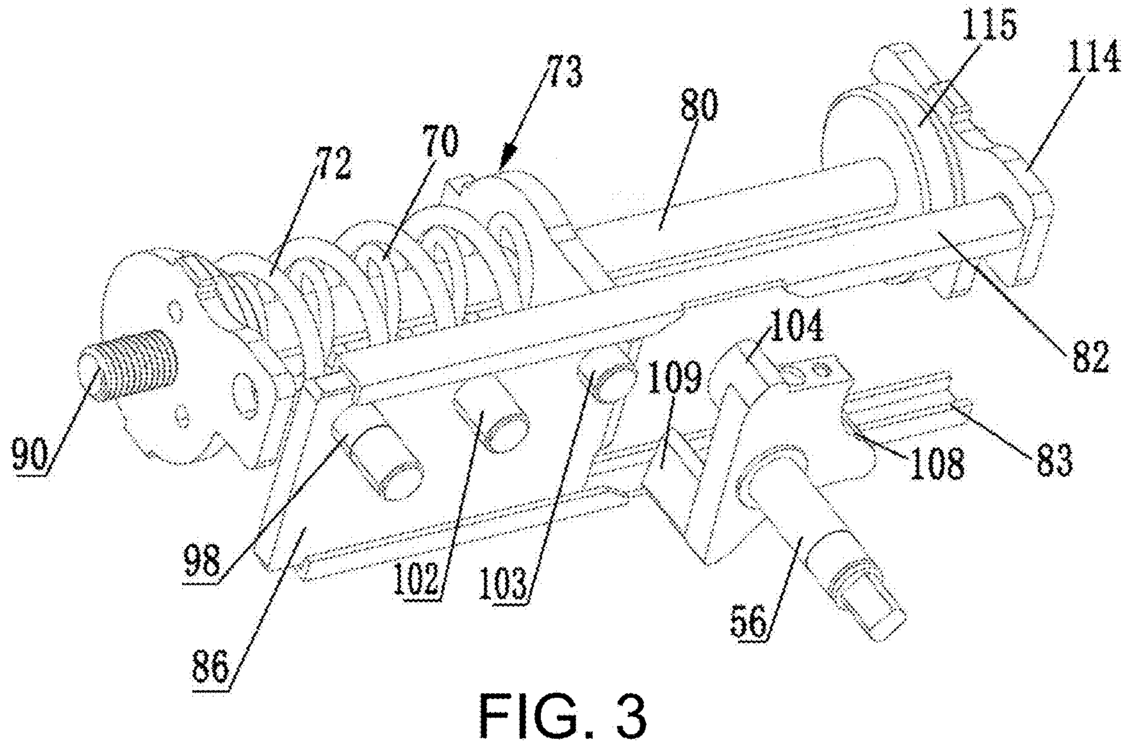
FIG. 3 is a schematic diagram of a stereoscopic structure of an emission mechanism and a jack assembly of the fastener driver in FIG. 1, and the emission mechanism is in a first position.

As shown in FIG. 2 and FIG. 3, a jack assembly 58 is positioned between the driving mechanism 46 and the emission mechanism 62, and is operated by the driving mechanism 46 so that the piston 66 and the driver firing pin 74 move to the first position 73 on the top against a bias force of the bias member 68. In the driving sequence period, the bias member 68 of the emission mechanism 62 pushes the driver firing pin 74 and the piston 66 from the first position 73 to the second position 75 so as to emit the fastener into the workpiece. The jack assembly 58 driven by the driving mechanism 46 is operable so that the piston 66 and the driver firing pin 74 moves from the second position 75 to the first position 73.

Now referring to FIG. 3, the driver 10 further includes a first guide member 80 glidingly supporting the piston 66 and second guide members 82 separated from the first guide member 80. The second guide members 82 glidingly support a support frame 86 which is connected with the piston 66 and moves together with the piston. The second guide members 82 are positioned between the first guide member 80 and the jack assembly 58, and are configured to glidingly support the support frame 86. In shown embodiments, the piston 66 and the support frame 86 are integrally formed into a single part, so the first guide member 80 and the second guide members 82 all glidingly support the piston 66. In the shown embodiments, the first guide member 80 is in a cylindrical shape, the second guide members 82 are respectively U-shaped rigid members disposed on the left side and right side of the housing. Therefore, the piston 66 may be in response to the rotation of the jack assembly 58 to freely move along the first guide member 80 and the second guide members 82.

Figure 7:
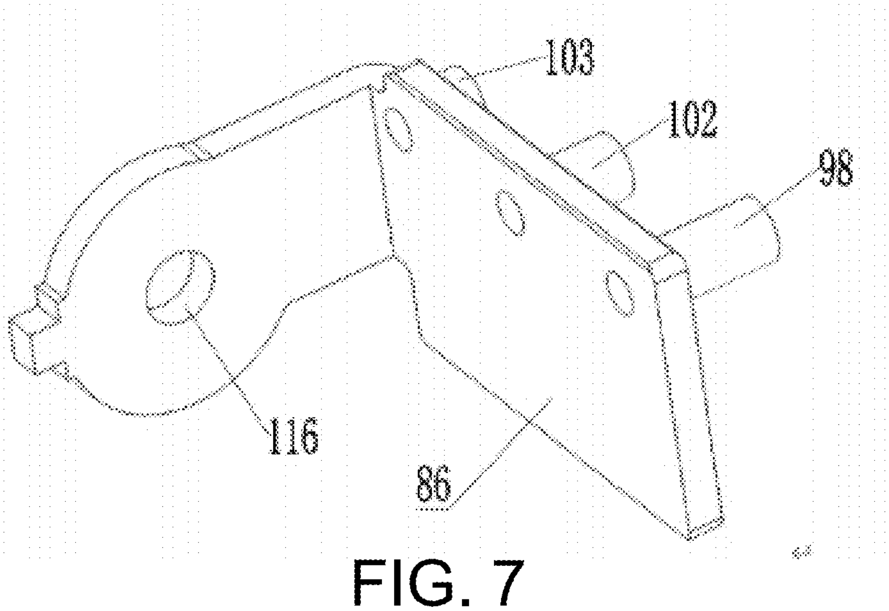
FIG. 7 is a schematic diagram of a stereoscopic structure of a support frame.

Now referring to FIG. 7, the piston 66 is shown in detail. The piston 66 defines: a first hole 116. A size of the first hole is determined to receive and support the first guide member 80 along an axial line 90 of the first guide member 80. Upper and lower guide edges of the support frame 86 are matched with the second guide members 82 to realize the smooth operation of the jack assembly 58.

Figure 8:
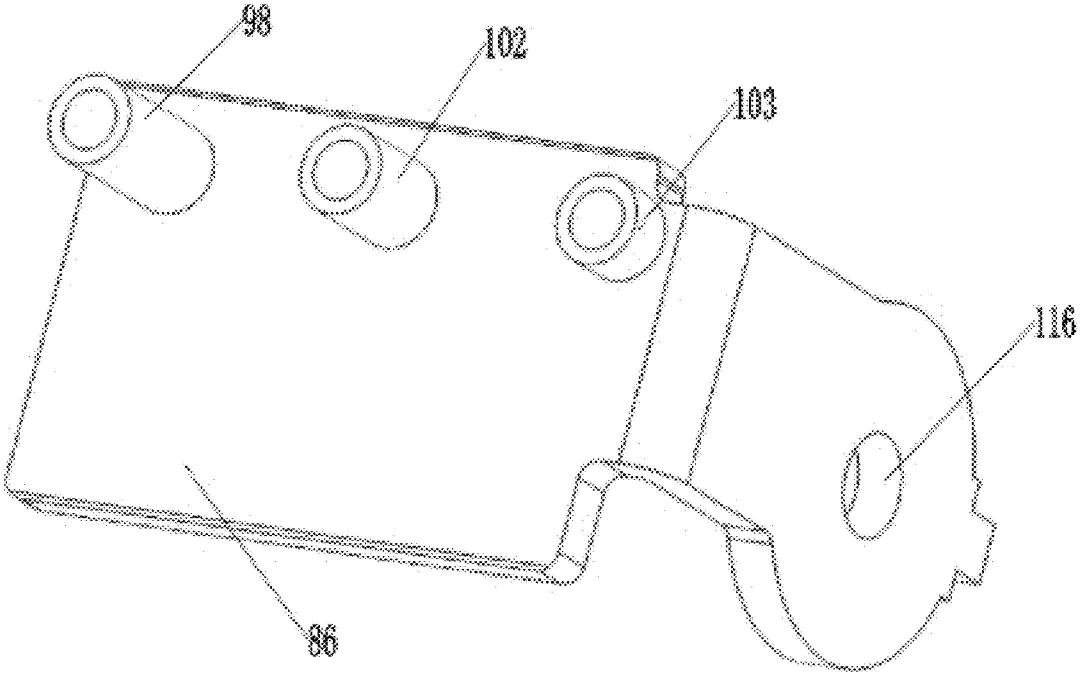
FIG. 8 is a schematic diagram of another stereoscopic structure of the support frame in FIG. 7.

Now referring to FIG. 8, the support frame 86 includes a first protruding shaft 98, a second protruding shaft 102 and a third protruding shaft 103. The first protruding shaft is disposed in a manner of being perpendicular to the support frame 86 and leaving far away from the first guide member. The second protruding shaft 102 and the third protruding shaft 103 are parallel to the first protruding shaft 98 and are separated from each other. The first protruding shaft 98, the second protruding shaft 102 and the third protruding shaft 103 all extend towards the jack assembly 58. In the shown embodiments, the first protruding shaft 98 extends for a longer distance from the support frame 86 (for example, towards the jack assembly 58) than the second protruding shaft 102, and the second protruding shaft 102 extends for a longer distance from the support frame 86 (for example, towards the jack assembly 58) than the third protruding shaft 103. In other words, the first protruding shaft 98 is longer than the second protruding shaft 102, and the second protruding shaft 102 is longer than the third protruding shaft 103. The jack assembly 58 includes a first protruding portion 104, a second protruding portion 108 and a third protruding portion 109. The first protruding portion 104, the second protruding portion 108 and the third protruding portion 109 are respectively and selectively engaged with one corresponding protruding shaft of the first protruding shaft 98, the second protruding shaft 102 and the third protruding shaft 103 formed on the support frame 86 of the piston 66 so as to transmit the moment output by the output shaft 56 to the emission mechanism 66.

Figure 4:
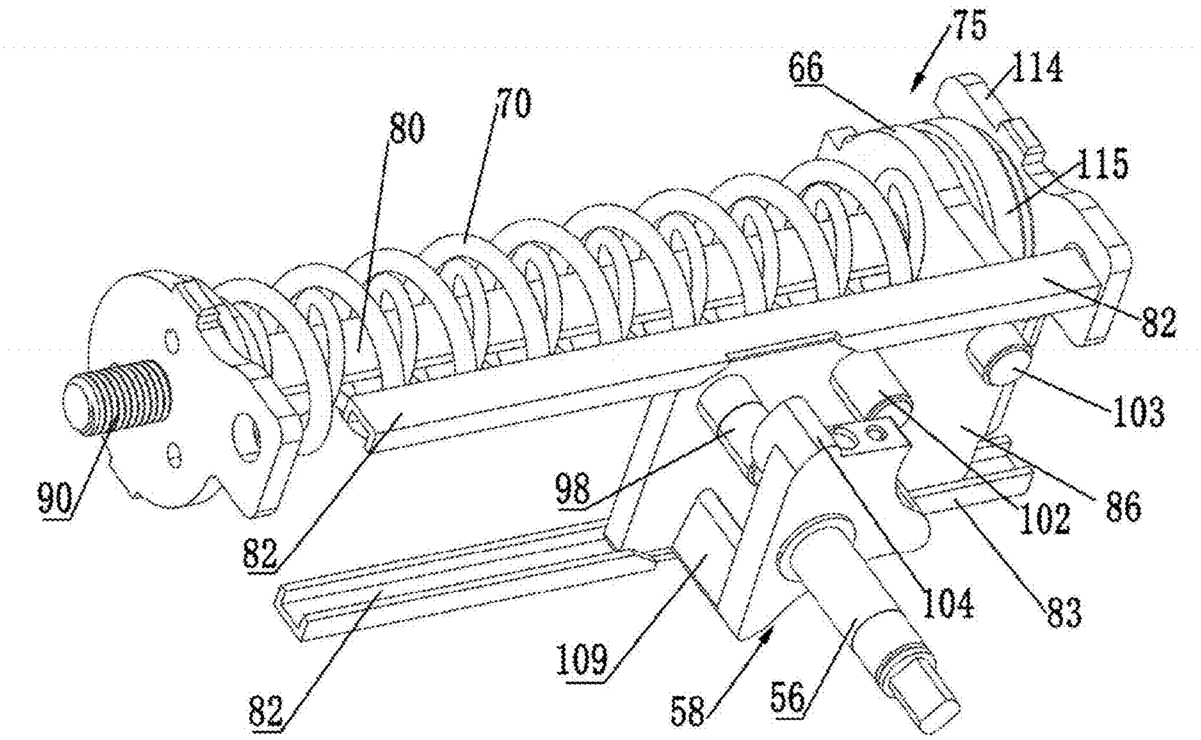
FIG. 4 is a schematic diagram of a stereoscopic structure of an emission mechanism and a jack assembly of the fastener driver in FIG. 1, the emission mechanism is in a second position, and a schematic diagram of another structure of a guide member is shown.

In the shown embodiments, the second protruding portion 108 extends for a longer distance from the jack assembly 58 (for example, towards the support frame 86) than the first protruding portion 104, so that the size of the second protruding portion 108 is determined to be matched with the second protruding shaft. The third protruding portion 109 extends for a longer distance from the jack assembly 58 (for example, towards the support frame 86) so that the size of the third protruding portion 109 is determined to be matched with the third protruding shaft 103. In other words, the second protruding portion 108 protrudes for a longer distance than the first protruding portion 104, and the third protruding portion protrudes for a longer distance than the second protruding portion. Through structures of the jack assembly 58 and the support frame 86, the piston 66 and the driver firing pin 74 moves from the second position 75 to the first position 73 in a single fastener driving cycle period. The second guide member 82 is positioned near the jack assembly 58 and is next to the jack assembly, so when the jack assembly 58 enables the piston 66 to move towards the first position 73, the support frame 86 physically deflects, and therefore the bending stress received by the support frame 86 is reduced. In the whole movement process, the support frame 86 is always reliably positioned between the second guide members 82. Specifically, as shown in FIG. 3 and FIG. 4, the second guide members 82 are made into two U-shaped structures, and are reliably connected with the upper and lower portions of the housing.

Figure 9:
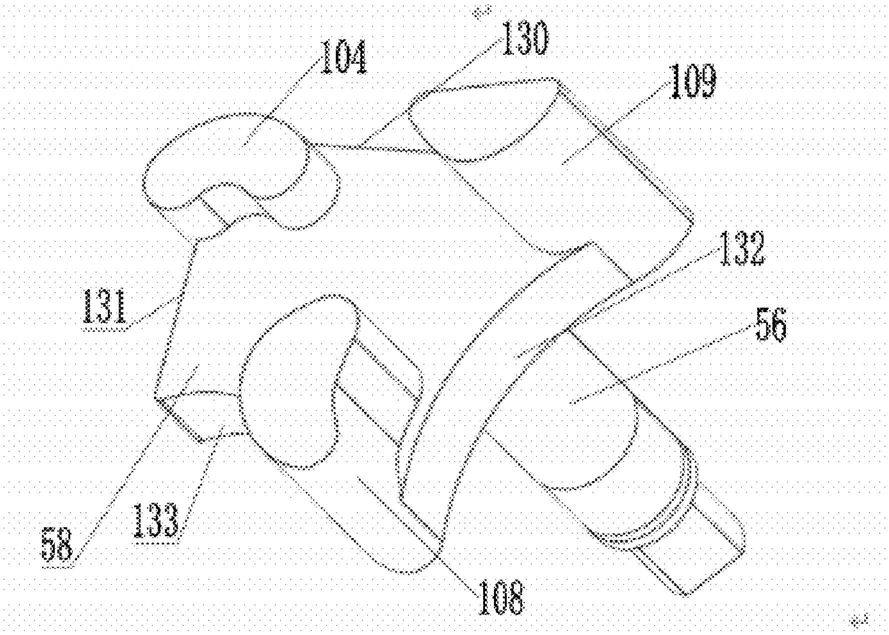
FIG. 9 is a schematic diagram of a stereoscopic structure of a jack assembly.

Referring to FIG. 9, the jack assembly 58 includes an approximately square shape defined by a long straight line surface 130, a short straight line surface 131, a long concave arc surface 132 and a short concave arc surface 133. The first protruding portion 104 is positioned in an intersection vertex of the long straight line surface 130 and the short straight line surface 131, the second protruding portion 108 is positioned in an intersection vertex of the long concave arc surface 132 and the short concave arc surface 133, and the third protruding portion 109 is positioned in an intersection vertex of the long straight line surface 130 and the long concave arc surface 132. Each of the first protruding portion 104, the second protruding portion 108 and the third protruding portion 109 is formed by being defined by a plurality of arcs. Through the adoption of these shapes, the minimum friction between the protruding shafts and the protruding portions in the contact process with the protruding shafts is ensured (it will be described in detail below). In order to further reduce the friction between the protruding portions and the protruding shafts, a round rotating ring 96 capable of rotating on the protruding shaft may be sheathed outside each of the protruding shafts, so that the sliding friction and rolling friction between the protruding portions and the protruding shafts may be totally changed into rolling friction. As we all know, under the condition of the same acting force, the rolling friction is much smaller than sliding friction.

Figure 10:
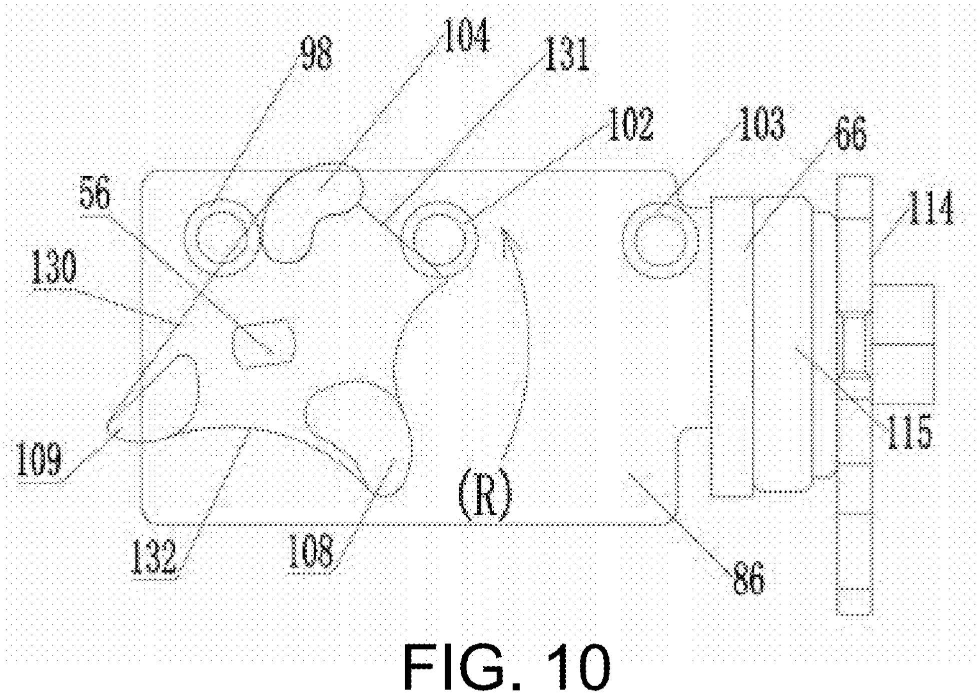
FIG. 10 is a perspective schematic diagram when a first protruding portion and a first protruding shaft of a jack assembly start to be in contact.
Figure 11:
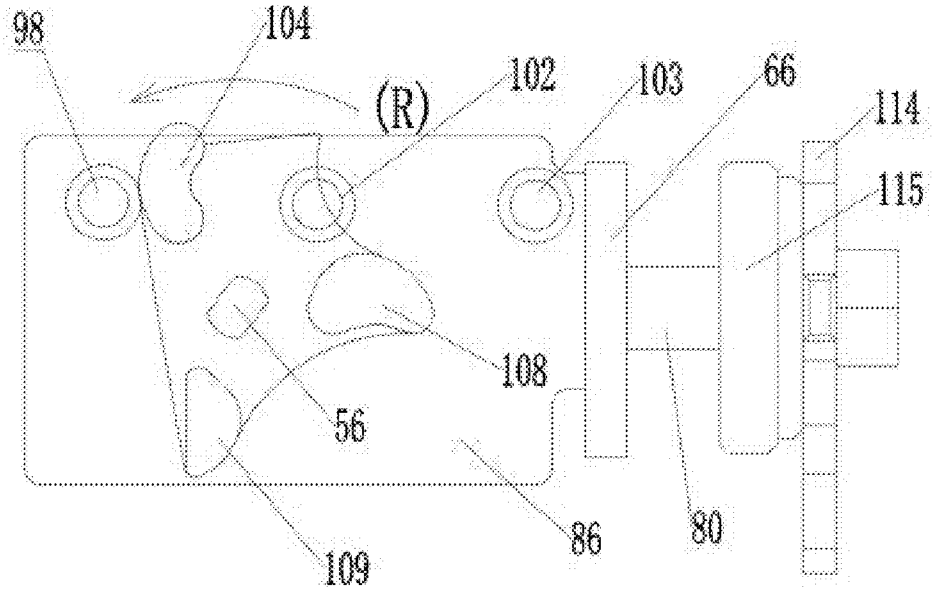
FIG. 11 is a perspective schematic diagram when a first protruding portion and a first protruding shaft of a jack assembly are in a middle contact state.
Figure 12:
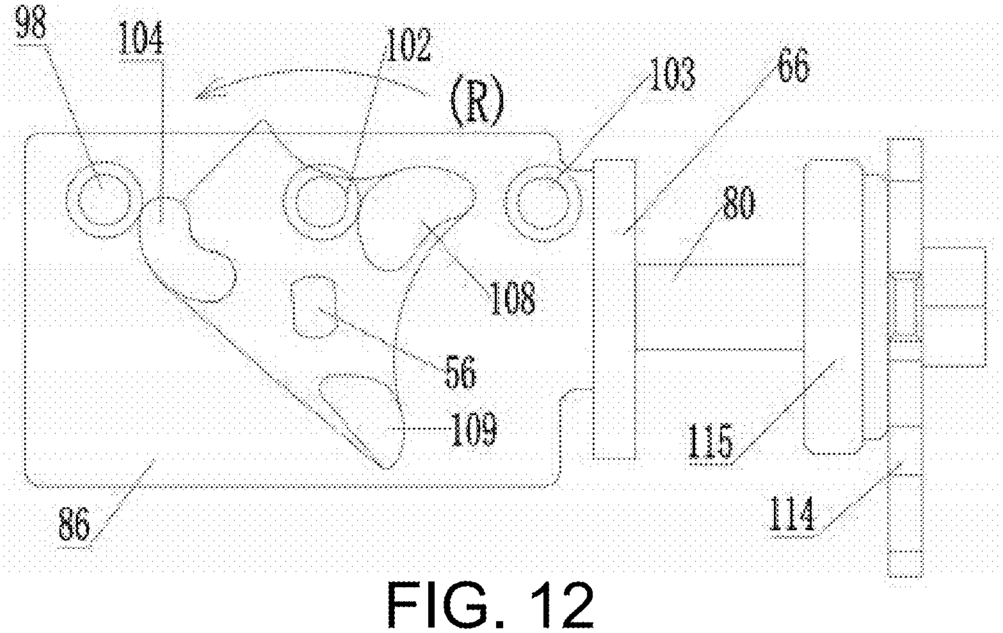
FIG. 12 is a perspective schematic diagram when a first protruding portion and a first protruding shaft of a jack assembly are in a farthest end contact state.

Continuously referring to FIG. 10 to FIG. 12, a motion relationship between the first protruding shaft 98 and the first protruding portion 104 is schematically shown.

As shown in FIG. 10 (referring to FIG. 3 at the same time), the support frame 86 and the piston 66 are located in the initial second position 75, and rotate anticlockwise under the power output of the output shaft 56 along with the jack assembly 58. Firstly, the first protruding portion 104 on the jack assembly 58 is in contact with the first protruding shaft 98. With the continuous rotation of the jack assembly 58, through the first protruding shaft 98, the first protruding portion 104 drives the support frame 86 to move from the second position 75 to the first position 73 against the bias member 68. Referring to FIG. 11, with the continuous rotation of the jack assembly 58, the first protruding portion 104 pushes the support frame 86 to continuously leave far away from the second position 75 and to move towards the first position 73. Referring to FIG. 12, with the continuous rotation of the jack assembly 58, when the jack assembly 58 rotates to a certain angle, the contact between the first protruding portion 104 and the first protruding shaft 98 reach the farthest end, and then, the first protruding portion 104 starts to be separated from the first protruding shaft 98.

In the whole process from the contact of the first protruding portion 104 with the first protruding shaft 98 to the separation of the first protruding portion 104 from the first protruding shaft 98, in order to realize stable operation of the support frame 86, the torsion output by the first protruding portion 104 to the first protruding shaft 98 needs to be uniformly changed, at the same time, output thrust of the first protruding portion 104 needs to be possibly converted into the bias force against the bias member 68, i.e., the output efficiency is improved. The friction between the first protruding portion 104 and the first protruding shaft 98 needs to be as small as possible. In order to achieve the two above points, according to the present invention, the first protruding shaft 98 is designed to present a cylindrical shape, and the surface of the first protruding portion 104 in contact with the first protruding shaft 98 is designed to present a convex arc shape. Additionally, a contact point between the first protruding portion 104 and the first protruding shaft 98 in the whole force transmission process is ensured to be always a highest point between the first protruding portion and the first protruding shaft (referring to FIG. 10 to FIG. 12), that is, the contact surfaces between the first protruding portion 104 and the first protruding shaft 98 are always maintained to be in arc surface and cylindrical surface contact. In order to further reduce the sliding friction caused by translational motion between the first protruding portion 104 and the first protruding shaft 98, a round ring capable of doing concentric rotation around the first protruding shaft 98 is sheathed outside the first protruding shaft 98, and the sliding friction is changed into rolling friction.

Figure 13:
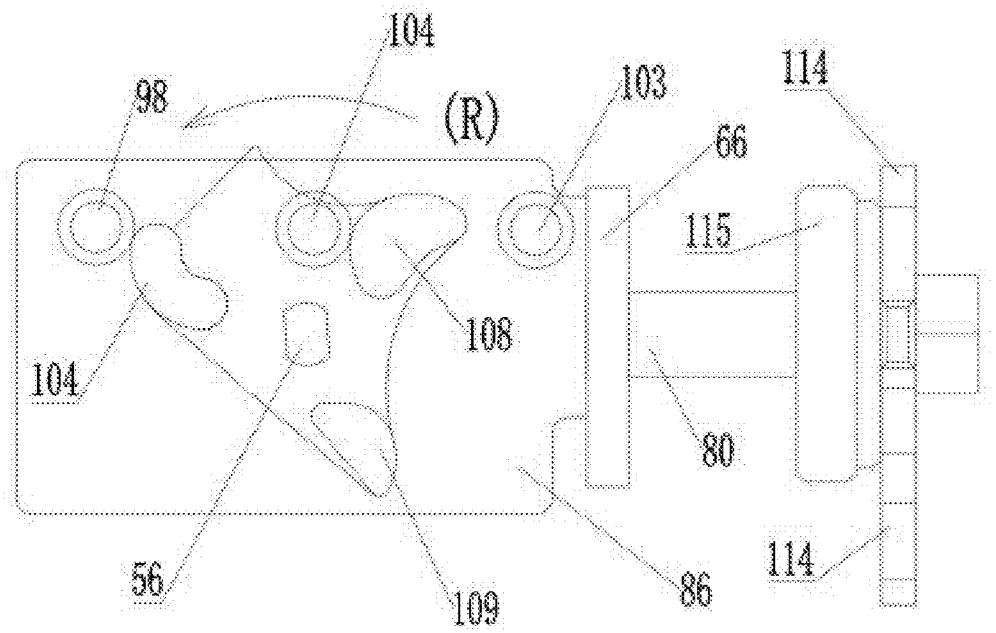
FIG. 13 is a perspective schematic diagram when a first protruding portion of the jack assembly is about to be separated from a first protruding shaft, and a second protruding portion and a second protruding shaft start to be in contact.

Referring to FIG. 13, with the continuous rotation of the jack assembly 58, the first protruding portion 104 starts to be ready to leave away from the first protruding shaft 98, at this moment, the second protruding portion 108 starts to be in contact with the second protruding portion 102, and the support frame 86 is further pushed to the first position 73.

Figure 14:
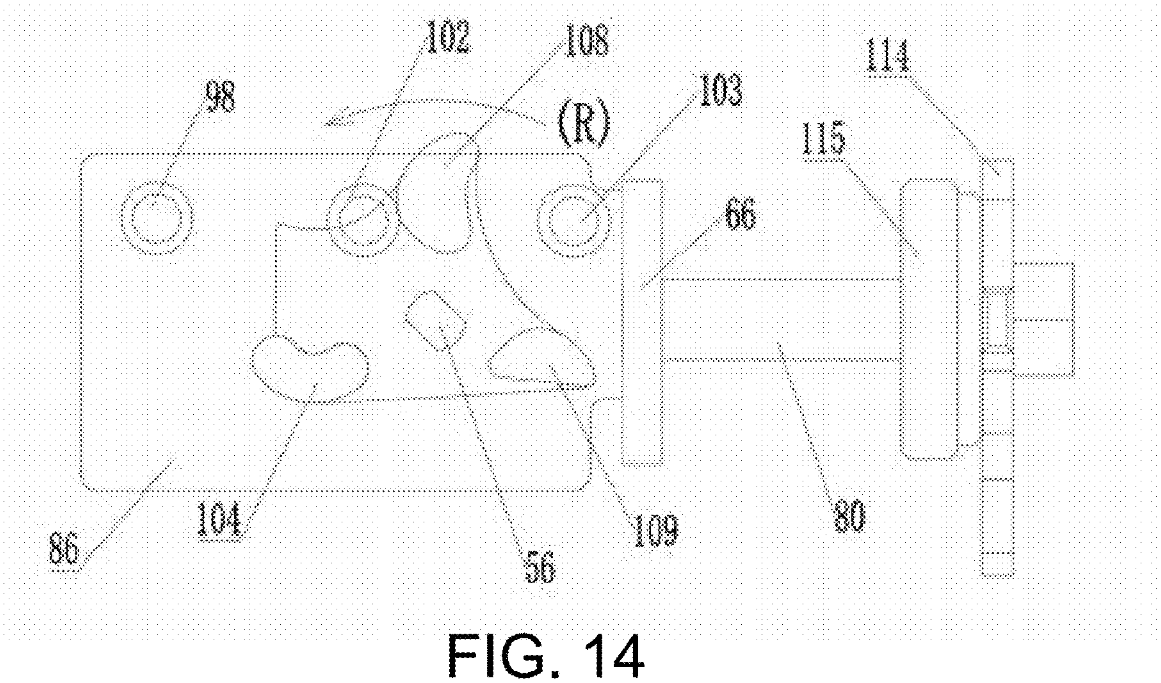
FIG. 14 is a perspective schematic diagram when a second protruding portion and a second protruding shaft of the jack assembly are in a middle contact state.

Referring to FIG. 14, with the continuous rotation of the jack assembly 58, the first protruding portion 104 is completely separated from the first protruding shaft 98, the second protruding portion 108 is completely in contact with the second protruding shaft 102, and the support frame 86 is further pushed to the first position 73.

Figure 15:
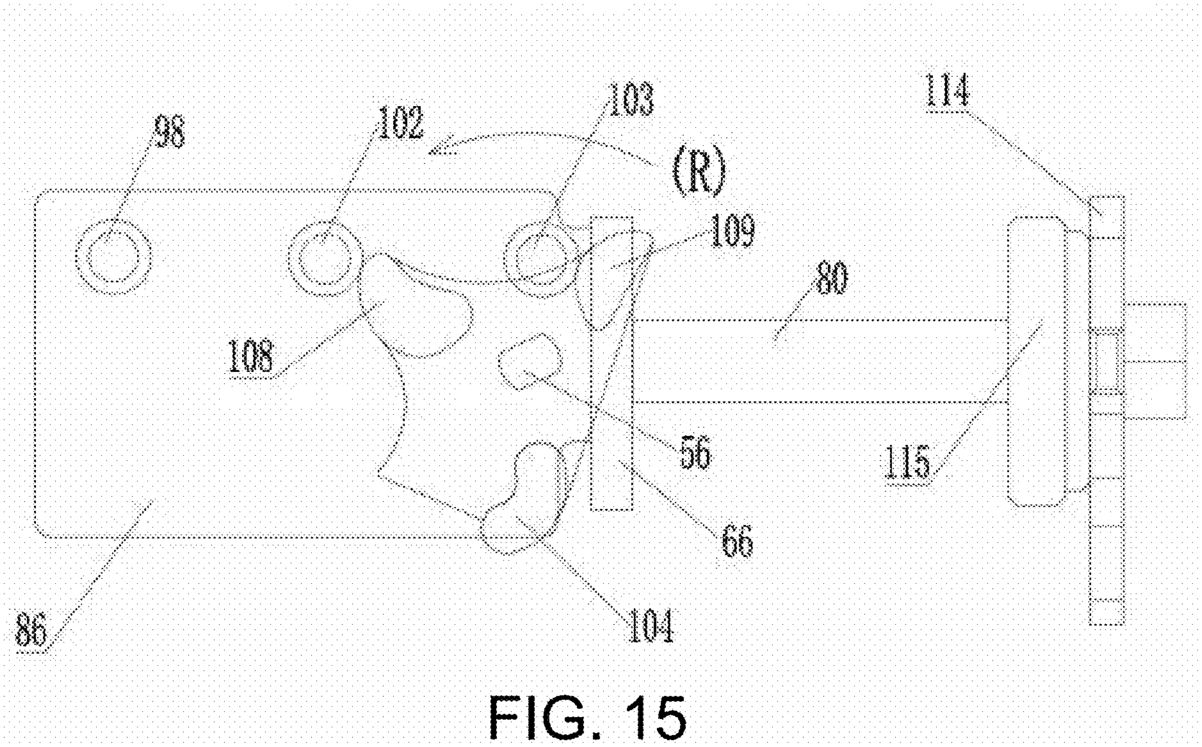
FIG. 15 is a perspective schematic diagram when a second protruding portion and a second protruding shaft of a jack assembly are in a farthest end contact state.

Referring to FIG. 15, with the continuous rotation of the jack assembly 58, the second protruding portion 108 pushes the second protruding shaft 102 to the farthest end, and the second protruding portion starts to be ready to leave away from the second protruding shaft. In a contact motion process of the second protruding portion 108 and the second protruding shaft 102 as shown in FIG. 13 to FIG. 15, the surface of the second protruding portion 108 with the second protruding shaft 102 is always in the highest stress point, and the second protruding shaft 102 is a cylindrical convex shaft. Through such a shape design, the friction between the second protruding portion 108 and the second protruding shaft 102 may be ensured to be minimum. Further, a movable round ring may be sheathed outside the second protruding shaft 102 which is the cylindrical protruding shaft, so that the friction between the second protruding portion and the second protruding shaft may be rolling friction, and the friction between the second protruding portion 108 and the second protruding shaft 102 is further reduced. At the same time, whole structures of the second protruding portion 108 in the convex arc shape and the second protruding shaft 102 in the cylindrical shape realize the uniform stress in the motion process, the stability of a transmission process is ensured, and the shock of the machine is reduced.

Figure 16:
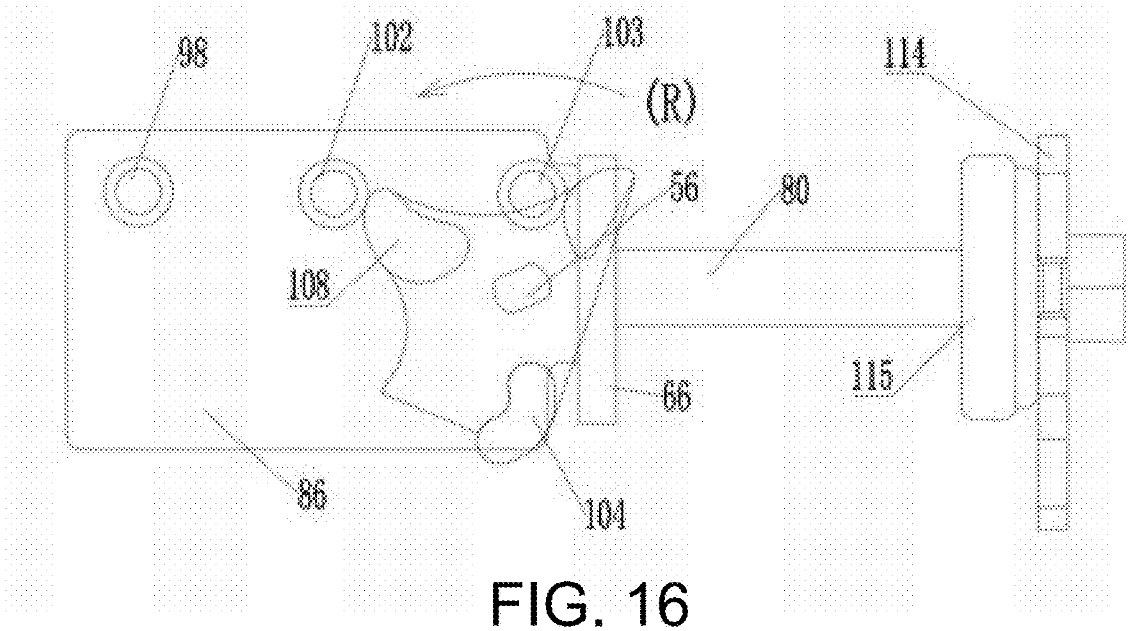
FIG. 16 is a perspective schematic diagram when a second protruding portion of the jack assembly is about to be separated from a second protruding shaft, and a third protruding portion and a third protruding shaft start to be in contact.

Referring to FIG. 16, with the continuous anticlockwise rotation of the jack assembly 58, the contact between the second protruding portion 108 and the second protruding shaft 102 reaches the highest point, and the second protruding portion and the second protruding shaft start to be separated from each other. At this moment, the third protruding portion 109 has started to be in contact with the third protruding shaft 103, and the third protruding portion 109 will continuously push the support frame 86 to the first position 73.

Figure 17:
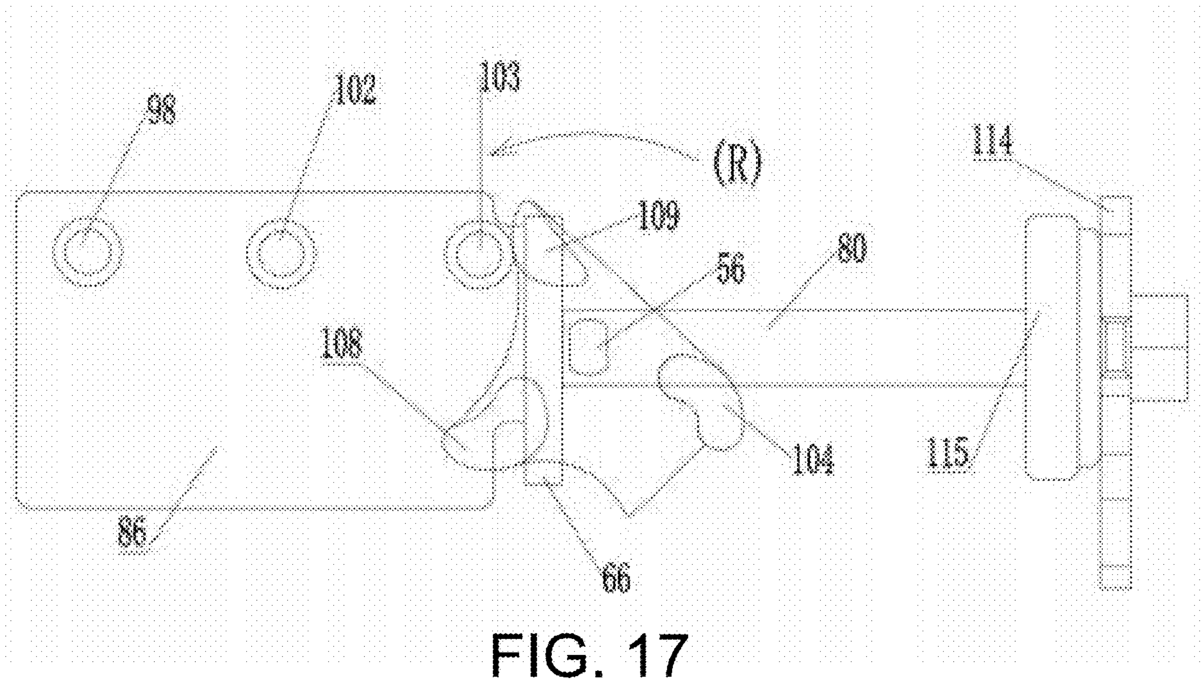
FIG. 17 is a perspective schematic diagram when a third protruding portion and a third protruding shaft of the jack assembly are in a middle contact state.

Referring to FIG. 17, with the continuous anticlockwise rotation of the jack assembly 58, the second protruding portion 108 is completely separated from the second protruding shaft 102, and the third protruding portion 109 independently exerts thrust to the third protruding shaft 103 to enable the support frame 86 to continuously move towards the first position 73.

Figure 18:
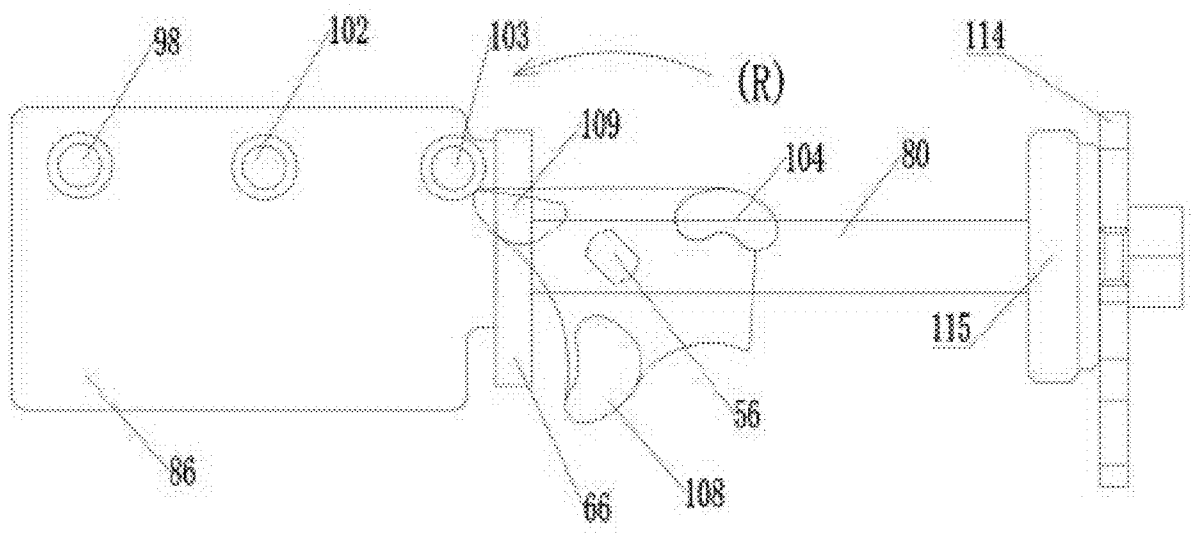
FIG. 18 is a perspective schematic diagram when a third protruding portion and a third protruding shaft of the jack assembly are in a farthest end contact state.

Referring to FIG. 18, with the continuous anticlockwise rotation of the jack assembly 58, the third protruding portion 109 pushes the third protruding shaft 103 to the farthest end. As mentioned above, the shape of the third protruding portion 109 is also set to reach the minimum friction between the third protruding portion 109 and the third protruding shaft 103. It is not repeated herein.

When the third protruding portion 109 bypasses the highest contact point with the third protruding shaft 103, the third protruding portion 109 suddenly leaves away from the third protruding shaft 103, the support frame 86 will fast move towards the second position 75 through being pushed by the bias force of the bias mechanism, and a nail in a nail box will be nailed into an object to be nailed through generated nailing force.

When the support frame 86 is in the second position 75, with the continuous rotation of the jack assembly 58, the first protruding portion 104 starts to be in contact with the first protruding shaft 98, a next cycle like it mentioned above is performed, and the support frame 86 is pushed from the second position 75 to the first position 73 again. The operation is cyclically repeated in such a manner.

From FIG. 10 to FIG. 18, a process of moving from the second position 75 to the first position 73, returning to the second position 75 and nailing the nail in the nail box into the object is completely shown. In a complete motion cycle, the first protruding shaft 98, the second protruding shaft 102 and the third protruding shaft 103 may be the protruding shafts located at the same height and having the same diameter (of course, the diameters may be different), the first protruding portion 104, the second protruding portion 108 and the third protruding portion 109 rotate around the output shaft of the jack assembly 58, and the shape changes according to the distances from the contact points of the first protruding shaft 98, the second protruding shaft 102 and the third protruding shaft 103, so that the uniform stress and minimum friction between the protruding shafts and the protruding portions in the whole process are ensured. The minimum shock amplitude of a product in the working process is ensured, the use of the product is stable, a user feels comfortable in operation, and the service life of the product in use is long.

Referring to FIG. 3 and FIG. 4, the emission mechanism 62 moves from the second position 75 to the first position 73, in a motion process of the emission mechanism 62, the jack assembly 58 transmits the torsion output from the electric motor 50 and passing through the gearbox 54 and the output shaft 56 to the emission mechanism 62 through the anticlockwise rotation. The whole motion process is as mentioned above, and is not repeated herein. In order to ensure the sufficient nailing force of the emission mechanism 62, the bias force of the bias mechanism 68 needs to be possibly overcome. In other words, the moving nailing force of the emission mechanism is greater if the distance between the second position 75 and the first position 73 is longer. Therefore, in the rotation process of the jack assembly 58, the protruding portion is expected to leave away from the rotating shaft 56 for a possibly longer distance. However, the longer distance of the protruding portion away from the rotating shaft 56 needs a greater rotating space, a brought negative effect is that the housing is thickened to provide the required rotating space, the product needs to be enlarged, inconvenience is brought to a customer in a product use process, and the product cost is also increased. Further, the torsion output by the output shaft 56 to the support frame 86 and the bias force output by the bias mechanism 68 to the support frame 86 are not in the same shaft, so that a deflection component force may be generated between the output shaft and the bias mechanism. In order to ensure the smooth operation of the bias mechanism 68, this deflection component force needs to be overcome by the support frame 86 in the moving process. According to the present invention, the support frame 86 is disposed in a friction-resistant rigid guide rail, and the rigid guide rail is reliably connected with the housing. Specifically, the second guide members 82 of the rigid guide rail are in U shapes, and half wrap upper and lower guide edges of the support frame 86. Further, the rigid guide rail may be used as an insert to be formed into a whole with the housing through injection moulding in various manners such as interference fit, or may be connected with the housing through screws, etc.

Figure 5:
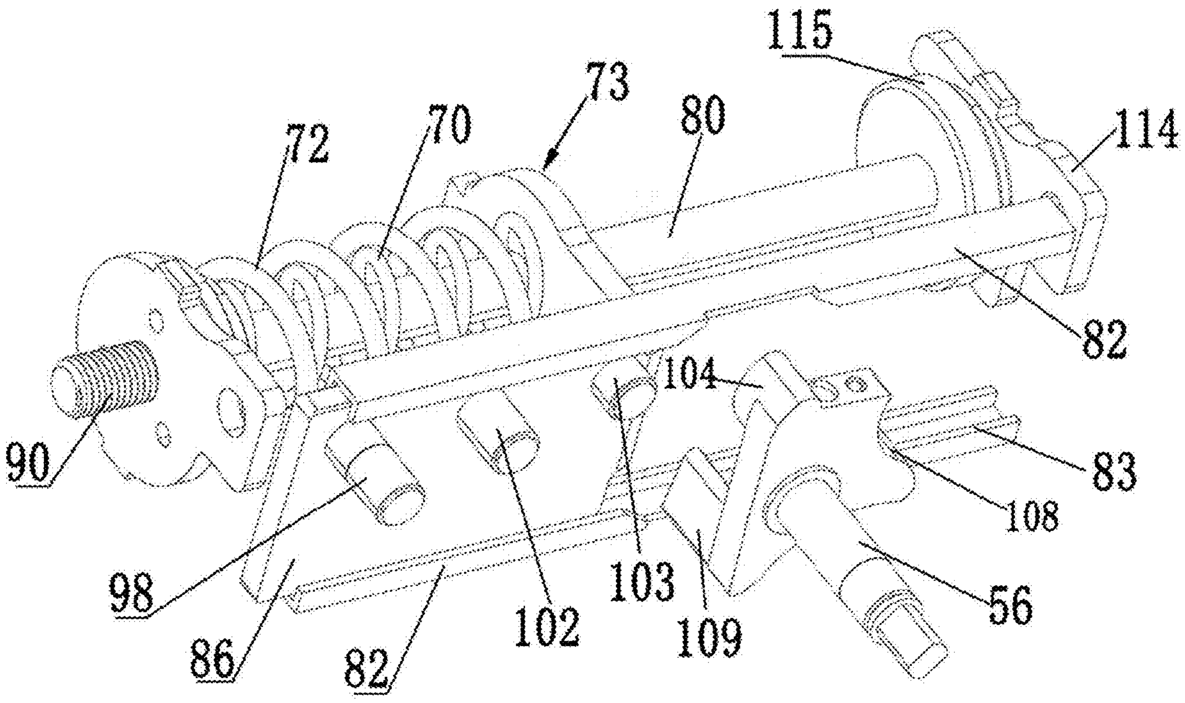
FIG. 5 is a stereoscopic schematic diagram of another structure of the guide member in FIG. 4, and the emission mechanism is in a first position.
Figure 6:
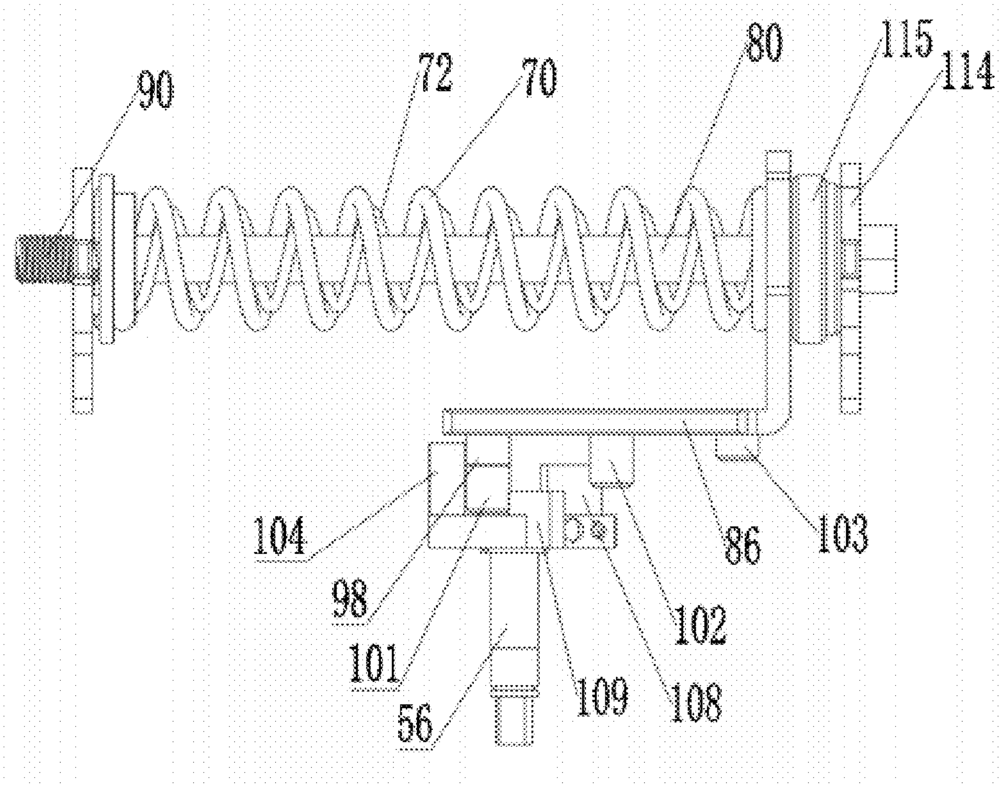
FIG. 6 is a schematic structural diagram of an emission mechanism and a jack assembly of the fastener driver in FIG. 1, and the emission mechanism is in a second position.

Referring to FIG. 10 to FIG. 18, in a complete motion cycle of the jack assembly 58, in order that the emission mechanism 62 obtains greater nailing force, in the rotating process of the jacking assembly 58, the protruding portion may exceed the upper and lower guide edges of the support frame 86, and the upper and lower guide edges of the support frame 86 are half-wrapped by the second guide members 82. In order to avoid the interference between the protruding portions and the guide groove, the following two structures are used for avoiding the problem. 1. The height of the third protruding portion 109 protruding out from the jack assembly 58 is as high as possible under the condition of ensuring the third protruding portion 109 to be in contact with the plane of the support frame 86, and the guide groove corresponding to the portion exceeding the support frame 86 in the rotating process is subjected to avoiding design, and the portions of the second guide members 82 generating interference with the third protruding portion 109 are removed. 2. The second guide members 82 are designed into a segmented type (as shown in FIG. 4 and FIG. 5).

In order to ensure the strength of the second guide members 82, the completeness of the second guide members 82 needs to be possibly ensured, and the interference U-shaped convex edges need to be reduced until parts of positions are completely removed, and only a plane portion is left (as shown in FIG. 3 and FIG. 4).

In order to ensure the strength of the second guide members 82, the height of the second protruding portion 108 is designed to avoid the interference with the U-shaped guide rail. Correspondingly, the height of the second protruding shaft 102 cooperating with the second protruding portion 108 is increased.

As mentioned above, the third protruding portion 109 is higher than the second protruding portion 108, the second protruding portion 108 is higher than the first protruding portion 104, and under the condition that the first protruding portion 104 has no interference with the U-shaped guide rail, the first protruding portion 104 may not have interference with the U-shaped guide rail.

Although the present invention has been described in detail with reference to some exemplary embodiments, there are variations and modifications within the scope and spirit of one or more independent aspects of the present invention, and these modifications are deemed to be consistent with the present invention so long as they do not depart from the purpose of the present invention.

What is claimed is:

1. A fastener driver, comprising:

a housing, limiting a head portion and a handle portion;

a driving mechanism, located in the housing;

an emission mechanism, comprising:

- a piston;
- a driver firing pin, attached to the piston;
- a bias mechanism, provided with a first end portion supported in the piston and a second end portion supported by the head portion, and configured to enable the piston and the driver firing pin to move from a first position to a second position;
- a jack assembly, driven by the driving mechanism to enable the piston and the driver firing pin to move from the second position to the first position against a bias force of the bias mechanism;

a first guide member, movably supporting the piston; and second guide members, movably supporting a support frame connected with the piston and moving together with the piston, located between the first guide member and a jack, and disposed in parallel to the first guide member, wherein cylindrical protruding shafts are disposed on the support frame in a protruding manner towards the jack assembly, convex arc-shaped protruding portions are disposed on the jack assembly in a protruding manner towards the support frame, and the protruding portions and the protruding shafts cooperate with each other to transmit torsion output by the driving mechanism to the emission mechanism; and due to convex arc shapes of the protruding portions, acting forces received by the protruding portions and the protruding shafts in the relative motion process of the protruding portions and the protruding shafts is always in an arc and cylindrical surface contact state.

2. The fastener driver according to claim 1, wherein the first guide member is in a cylindrical shape, and the emission mechanism is sheathed on a first guide mechanism.

3. The fastener driver according to claim 1, wherein the second guide members are a pair of U-shaped rigid members, the second guide members are fixedly disposed in the housing, and the support frame is located between the second guide members and slides between the second guide members.

4. The fastener driver according to claim 1, wherein avoiding portions are formed in the second guide members, and the second guide members are able to avoid interference in a rotating process of the jack assembly due to the avoiding portions.

5. The fastener driver according to claim 1, wherein the protruding shafts and the protruding portions are at least two pairs and are disposed in pairs.

6. The fastener driver according to claim 5, wherein heights of the protruding shafts protruding from the support frame sequentially rise from the second position to the first position, that is, a height of a first protruding shaft protruding from the support frame is the highest, a height of a second protruding shaft protruding from the support frame is the second highest, and a height of a third protruding shaft protruding from the support frame is the lowest; and protruding heights of the protruding portions cooperating with the protruding shafts correspondingly and sequentially decrease, that is, a protruding height of a first protruding portion is the lowest, a protruding height of a second protruding portion is the second lowest, and a protruding height of a third protruding portion is the highest.

7. The fastener driver according to claim 6, wherein a rotatable sheathing ring is sheathed outside each of the protruding shafts, the protruding portions and the corresponding sheathing rings act with each other, and an output moment of the driving mechanism is transmitted to the emission mechanism.

8. The fastener driver according to claim 1, wherein circle center connecting lines of the protruding shafts are parallel to the first guide member.

9. The fastener driver according to claim 1, wherein the support frame is in a 90° L shape, the protruding shafts are integrally disposed on the support frame, a through hole is further formed in the support frame, and the first guide member passes through the through hole.

10. The fastener driver according to claim 1, wherein the support frame is in a 90° L shape, the support frame is formed by bending a metal plate, and the protruding shafts are formed into a whole with the support frame through welding, riveting or interference fit.

* * * * *